US010658888B2

(12) United States Patent
Tsuiki et al.

(10) Patent No.: US 10,658,888 B2
(45) Date of Patent: May 19, 2020

(54) ROTARY ELECTRIC MACHINE INCLUDING AN INNER CORE FORMED OF STEEL SHEETS WITH CONNECTED AND NON-CONNECTED TOOTH PORTIONS AND MANUFACTURING METHOD THEREFOR

(71) Applicant: MITSUBISHI ELECTRIC CORPORATION, Chiyoda-ku, Tokyo (JP)

(72) Inventors: Hironori Tsuiki, Tokyo (JP); Koji Kawamura, Tokyo (JP); Hiroyuki Akita, Tokyo (JP); Akira Hashimoto, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 358 days.

(21) Appl. No.: 15/561,406

(22) PCT Filed: Apr. 19, 2016

(86) PCT No.: PCT/JP2016/062408
§ 371 (c)(1),
(2) Date: Sep. 25, 2017

(87) PCT Pub. No.: WO2016/178368
PCT Pub. Date: Nov. 10, 2016

(65) Prior Publication Data
US 2018/0109154 A1 Apr. 19, 2018

(30) Foreign Application Priority Data
May 7, 2015 (JP) ................... 2015-094597

(51) Int. Cl.
*H02K 1/18* (2006.01)
*H02K 15/02* (2006.01)
(Continued)

(52) U.S. Cl.
CPC ............... *H02K 1/18* (2013.01); *H02K 1/148* (2013.01); *H02K 15/022* (2013.01); *H02K 15/024* (2013.01); *H02K 1/17* (2013.01)

(58) Field of Classification Search
CPC ...................................... H02K 1/18; H02K 1/17; H02K 1/148; H02K 15/022; H02K 15/024
See application file for complete search history.

(56) References Cited

U.S. PATENT DOCUMENTS 8,466,597 B2 * 6/2013 Yabe .................... H02K 17/205
310/216.069
2012/0223600 A1 * 9/2012 Tonogi .................. H02K 1/148
310/46

(Continued)

FOREIGN PATENT DOCUMENTS

JP   2003-088007 A   3/2003
JP   2003-088012 A   3/2003

(Continued)

OTHER PUBLICATIONS

International Search Report (PCT/ISA/210) dated Jul. 5, 2016, by the Japanese Patent Office as the International Searching Authority for International Application No. PCT/JP2016/062408.

(Continued)

*Primary Examiner* — Emily P Pham
(74) *Attorney, Agent, or Firm* — Buchanan Ingersoll & Rooney PC

(57) ABSTRACT

A stator is assembled by stacking, in the axial direction, a plurality of magnetic steel sheets having tooth portions. The steel sheets include connected tooth steel sheets in which the inner-circumferential-side end portions of the tooth portions are connected via connection portions in an annular shape along the circumferential direction, and non-connected tooth steel sheets which are separated from each other with the tooth portions not connected to each other. The connected (Continued)

tooth steel sheets and the non-connected tooth steel sheets are joined to each other in the axial direction via swage portions provided in the tooth portions. The thickness of each connection portion is smaller than the thickness of the other part of each steel sheet.

5 Claims, 16 Drawing Sheets

(51) Int. Cl.
  *H02K 1/14* (2006.01)
  *H02K 1/17* (2006.01)

(56) References Cited

U.S. PATENT DOCUMENTS

| | | | | |
|---|---|---|---|---|
| 2014/0175935 A1* | 6/2014 | Tsuchiya | ................ | H02K 3/522 310/214 |
| 2015/0130311 A1* | 5/2015 | Murakami | ............. | H02K 1/185 310/89 |
| 2016/0036281 A1* | 2/2016 | Nakano | ................ | H02K 29/03 310/68 D |

FOREIGN PATENT DOCUMENTS

| JP | 2004-180383 A | 6/2004 |
|---|---|---|
| JP | 2005-080474 A | 3/2005 |
| JP | 2009-124789 A | 6/2009 |

OTHER PUBLICATIONS

Written Opinion (PCT/ISA/237) dated Jul. 5, 2016, by the Japanese Patent Office as the International Searching Authority for International Application No. PCT/JP2016/062408.

Office Action dated Oct. 9, 2018, by the Chinese Patent Office in corresponding Chinese Patent Application No. 201680010448.9 and English translation of the Office Action. (13 pages).

Office Action (Notification of Reasons for Refusal) dated May 8, 2018, by the Japanese Patent Office in corresponding Japanese Patent Application No. 2017-516581 and English translation of the Office Action. (5 pages).

\* cited by examiner (A)

(B)

(A)

(B)

(A)

(B)

(A)

(B)

ROTARY ELECTRIC MACHINE INCLUDING AN INNER CORE FORMED OF STEEL SHEETS WITH CONNECTED AND NON-CONNECTED TOOTH PORTIONS AND MANUFACTURING METHOD THEREFOR

TECHNICAL FIELD

The present invention relates to a rotary electric machine, and in particular, relates to an armature assembled by stacking cores, and a manufacturing method therefor.

BACKGROUND ART

In recent years, rotary electric machines such as electric motors and electric generators have been required to be high in efficiency and small in vibration. One of methods for achieving a motor that is small in vibration is to reduce the slot opening width of an armature. If the slot opening width is reduced, salient poles of the armature are decreased, whereby vibration can be suppressed. Here, the salient pole means a magnetic projection. In the armature, teeth are formed by iron and slots are formed by gaps (nonmagnetic coils), and therefore, as seen from the inner-side surface of the armature, tooth portions having small magnetic resistance and gaps having high magnetic resistance are arranged alternately, and thus the magnetic resistance appears in a discontinuous irregular form. This irregularity becomes a cause of vibration, and it is necessary to reduce the irregularity as much as possible in order to eliminate the vibration. However, if the ends of the teeth are too close to each other, a leakage magnetic flux circulating in a stator without passing through a rotor increases, thereby output is reduced.

In order to solve such a problem, Patent Document 1 discloses a plate-shaped core sheet having a plurality of core portions and a bridging portion via which the radially inner side ends of the plurality of core portions are connected to each other. And the bridging portion has a thin portion which is thinner than the plate thickness of the core sheet, and a part corresponding to the bridging portion has a greater magnetic resistance than the other parts. Thus, a leakage magnetic flux leaking and flowing to the bridging portion during operation of a brushless motor can be reduced, and decrease in an effective magnetic flux flowing in the core portion can be suppressed.

CITATION LIST

Patent Document

Patent Document 1: Japanese Laid-Open Patent Publication No. 2003-88007

SUMMARY OF THE INVENTION

Problems to be Solved by the Invention

However, the core configuration disclosed in Patent Document 1 has a limitation in thinning the connection portion in light of structure strength and press-forming pressure, and thus is insufficient as a measure for the leakage magnetic flux.

The present invention has been made to solve the above problem, and an object of the present invention is to provide a rotary electric machine in which steel sheets include connected tooth steel sheets in which the inner-circumferential-side end portions are connected by connection portions in an annular shape along the circumferential direction, and non-connected tooth steel sheets which are separated from each other without being connected to each other. Eventually, according to the present invention, the structural strength is kept and a leakage magnetic flux is effectively reduced, thereby high output can be achieved.

Means of Solution to the Problems

A rotary electric machine according to the present invention includes a rotor having a rotor core fixed to a rotary shaft, and a stator arranged with a gap from the rotor core. The stator is formed by a plurality of magnetic steel sheets having tooth portions and stacked in an axial direction.

The plurality of steel sheets include connected tooth steel sheets in which inner-circumferential-side end portions of the tooth portions are connected via connection portions in an annular shape along a circumferential direction, and non-connected tooth steel sheets which are separated from each other with the tooth portions not connected to each other.

The connected tooth steel sheets and the non-connected tooth steel sheets are joined to each other in the axial direction via swage portions provided in the tooth portions, and the thickness of each connection portion is smaller than the thickness of the other part of each steel sheet.

Effect of the Invention

In the rotary electric machine configured as described above, leakage magnetic flux of a stator can be reduced, and it is possible to provide a high-output motor.

EMBODIMENTS FOR CARRYING OUT THE INVENTION

Embodiment 1

Figure 1:
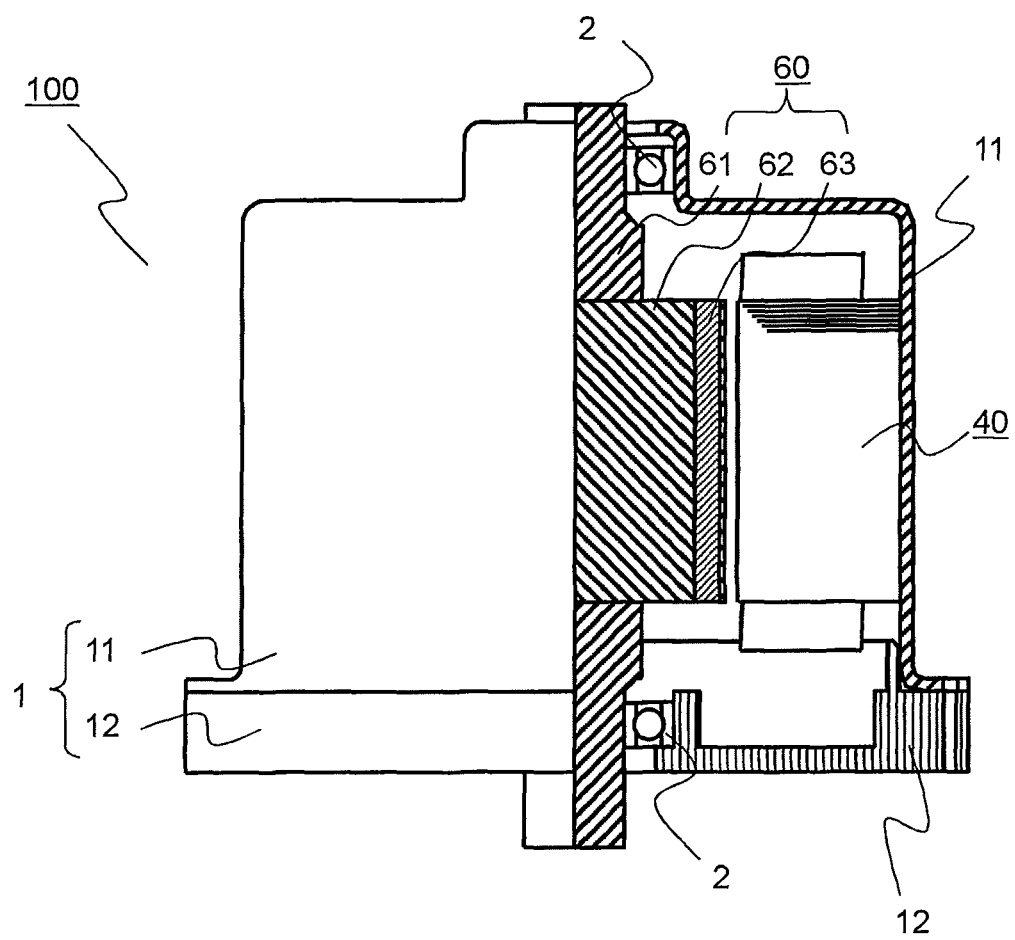
FIG. 1 is a partially sectional front view showing a rotary electric machine according to embodiment 1.

Hereinafter, a rotary electric machine and a manufacturing method for the rotary electric machine according to embodiment 1 will be described with reference to the drawings. As used herein, the wordings "circumferential direction", "radial direction", "axial direction", "inner", and "outer" refer to the "circumferential direction", "radial direction", and "axial direction" of an armature of the rotary electric machine, and further, the "inner side", "inner circumference", "outer side", and "outer circumference" of the armature. FIG. 1 is a partially sectional front view showing the rotary electric machine according to embodiment 1.

In FIG. 1, the rotary electric machine 100 has a housing 1, and the housing 1 includes a bottomed cylindrical frame 11 and an end plate 12 closing the opening of the frame 11. Further, the rotary electric machine 100 includes a stator 40 fixed inside the cylindrical part of the frame 11, and a rotor 60 arranged on the inner circumferential side of the stator 40 and rotatably supported via bearings 2 by the bottom portion of the frame 11 and the end plate 12.

The rotor 60 includes a rotor core 62 fixed to a rotary shaft 61, and permanent magnets 63 forming magnetic poles and embedded on the outer circumferential surface side of the rotor core 62 at a predetermined pitch along the circumferential direction. Thus, the rotor 60 forms a permanent magnet type rotor. The rotor 60 is not limited to a permanent magnet type rotor. The rotor 60 may be a squirrel cage rotor in which non-insulated rotor conductors are accommodated in slots of a rotor core and are short-circuited at both sides by short-circuit rings, or may be a wound rotor in which insulated conductive wires are mounted to slots of a rotor core.

Figure 2:
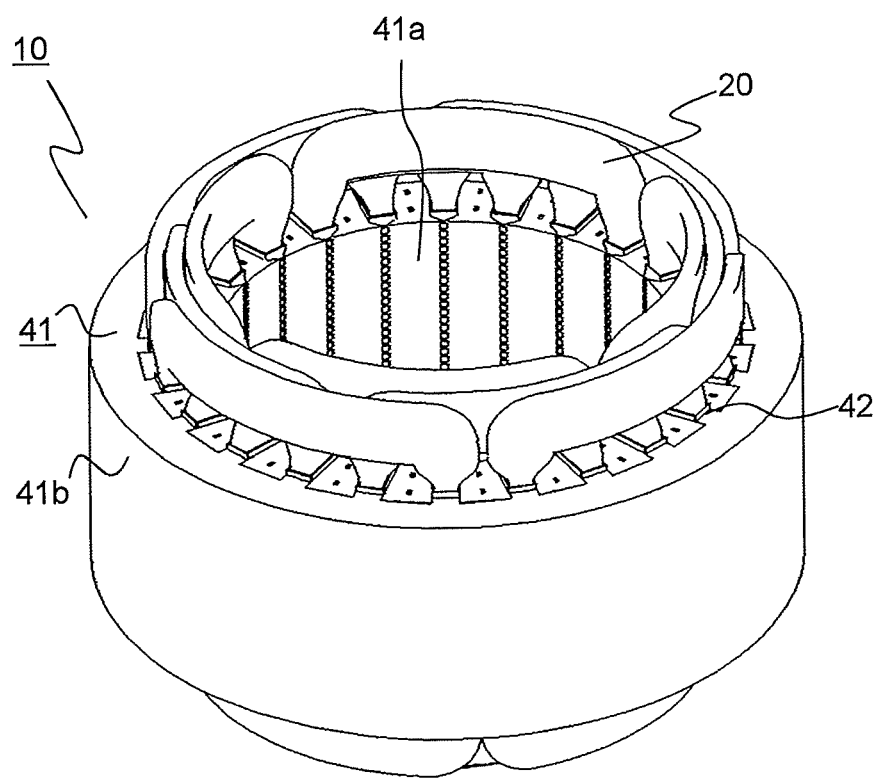
FIG. 2 is a perspective view showing an armature constituting a stator of the rotary electric machine according to embodiment 1.
Figure 3:
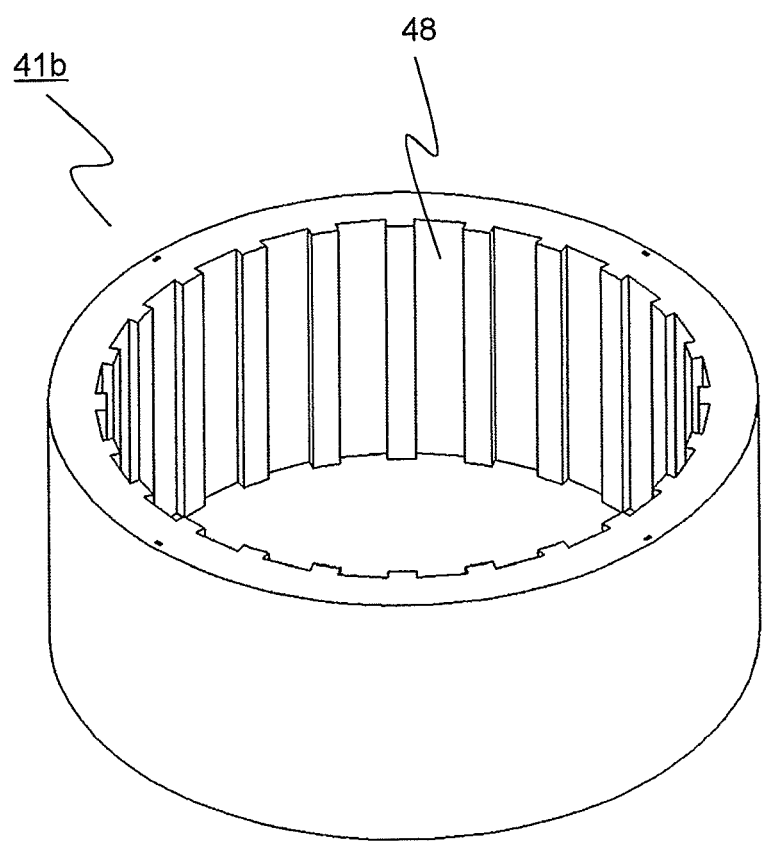
FIG. 3 is a perspective view showing an outer core according to embodiment 1.
Figure 4:
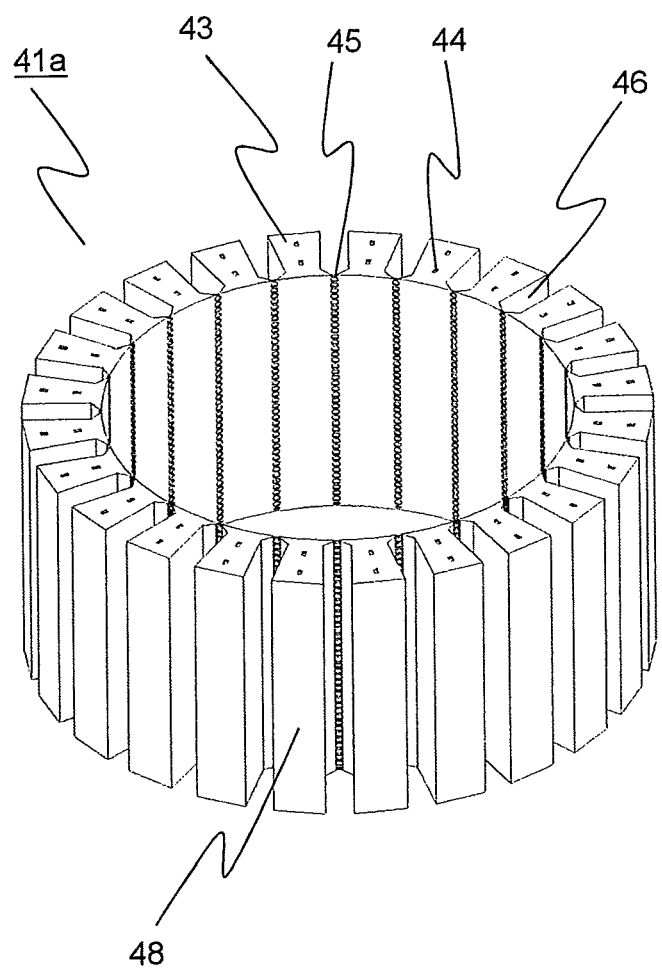
FIG. 4 is a perspective view showing an inner core according to embodiment 1.

FIG. 2 is a perspective view showing an armature constituting the stator of the rotary electric machine. As shown in FIG. 2, the armature 10 includes a core 41, coils 20 mounted to the core 41, and slot cells 42 for electrically insulating the coils 20 and the core 41 from each other. The coils 20 are formed by winding, by plural turns, conductive wires having insulating coat. As shown in FIG. 3 and FIG. 4, the core 41 is composed of an inner core 41*a* and an outer core 41*b*. The inner core 41*a* and the outer core 41*b* are configured such that the radially outer end of each tooth portion 43 formed in the inner core 41*a* is press-fitted to each divided surface 48 formed in the outer core 41*b*. The outer core 41*b* serves as a back yoke portion connecting the tooth portions 43.

Figure 5:
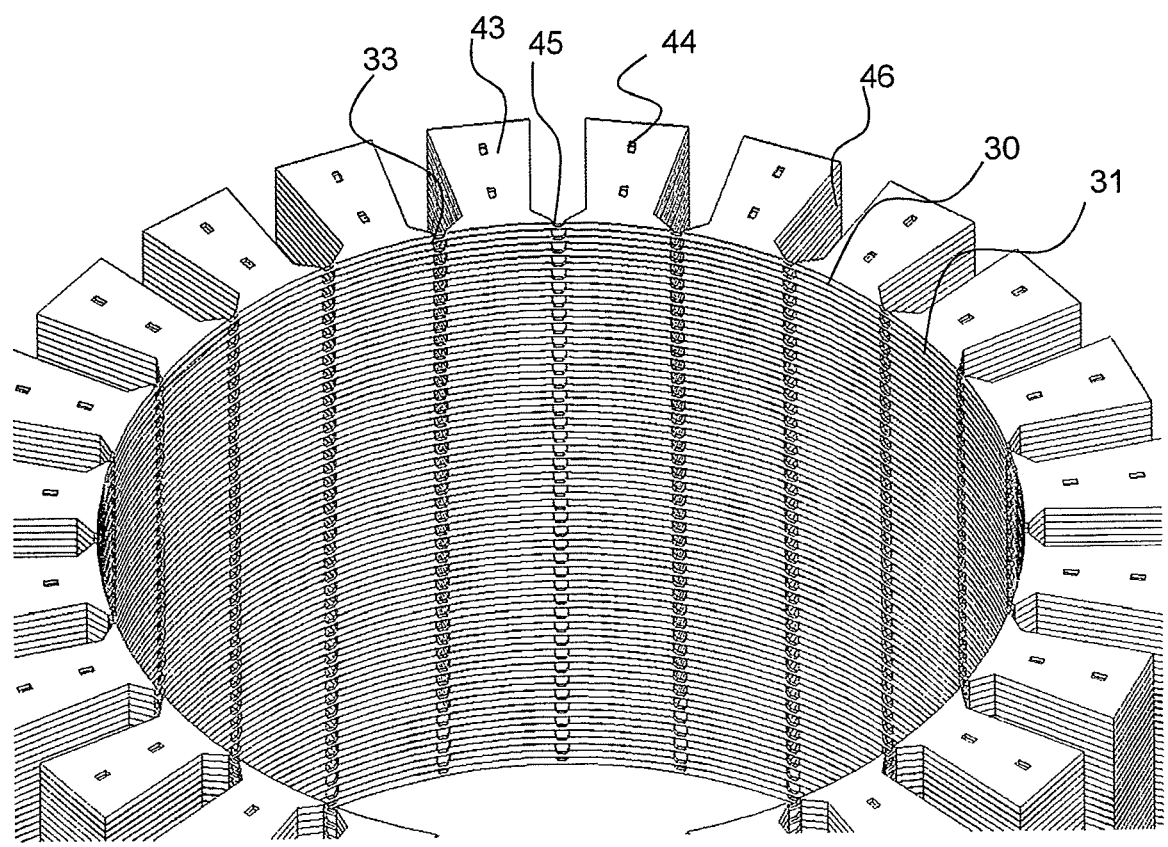
FIG. 5 is a partially enlarged perspective view showing the inner core according to embodiment 1.
Figure 6:
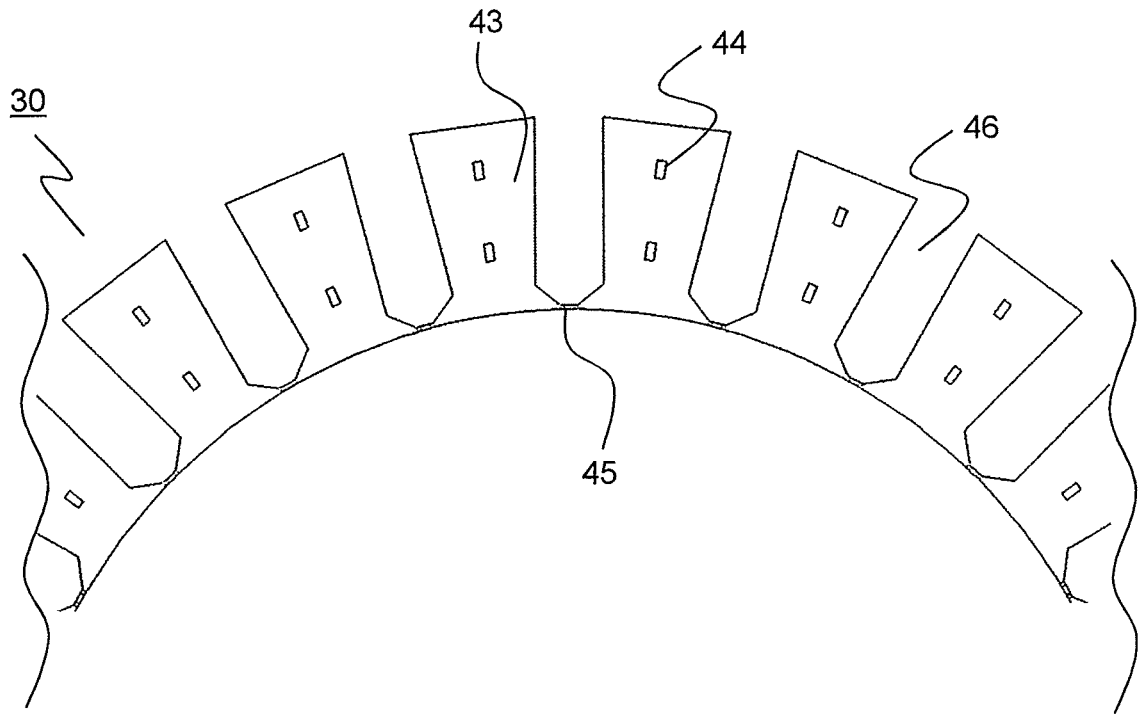
FIG. 6 is a plane view showing a connected tooth steel sheet according to embodiment 1.
Figure 7:
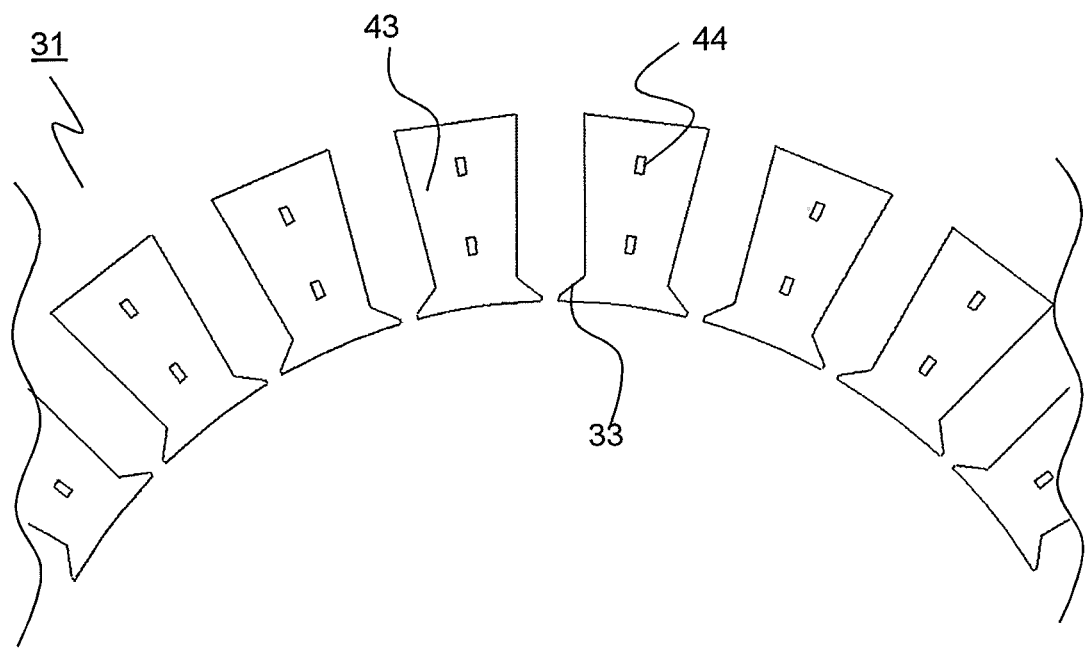
FIG. 7 is a plane view showing non-connected tooth steel sheets according to embodiment 1.

As shown in FIG. 4 and FIG. 5, the inner core 41*a* is formed by a magnetic steel sheets stacked in the axial direction, and has divided surfaces 48 to be brought into contact with the outer core 41*b* later. FIG. 6 and FIG. 7 are plane views showing two types of steel sheets to be stacked. FIG. 6 shows a connected tooth steel sheet 30 in which the inner-circumferential-side end portions of the tooth portions 43 are connected via connection portions 45 in an annular shape along the circumferential direction. FIG. 7 shows non-connected tooth steel sheets 31 with no connection portion, which are separated from each other and each have a flange 33 protruding in the circumferential direction, at a tooth end thereof. The connected tooth steel sheets 30 and the non-connected tooth steel sheets 31 are alternately joined one by one to each other in the axial direction via swage portions 44 formed in the tooth portions 43. Sectioned slots 46 are formed between the adjacent tooth portions 43.

By combining the connected tooth steel sheets 30 and the non-connected tooth steel sheets 31 as described above, leakage magnetic flux occurring at the tooth ends can be suppressed because there are gaps among the non-connected tooth steel sheets 31. In addition, the connection portions 45 of the connected tooth steel sheets 30 are thinner in the axial direction than the other tooth portions 43 and flanges 33. Since the connection portions 45 are thin, the magnetic resistance at the connection portions 45 is increased, so that leakage of magnetic flux occurring at these portions can be further suppressed. In addition, since the respective steel sheets are stacked one by one, each non-connected tooth steel sheet 31 is located between the connected tooth steel sheets 30, so that the positions of the non-connected tooth steel sheets 31 are stabilized.

As described above, in the connected tooth steel sheet 30, all the tooth portions 43 are connected at their tooth ends, and therefore the positions of the tooth portions 43 are stabilized.

On the other hand, the non-connected tooth steel sheets 31 are not connected, and therefore they are unstable. If the non-connected tooth steel sheets 31 only are successively stacked, each unstable tooth is joined to another unstable tooth by swaging, and thus the positions of these teeth are not stabilized. Therefore, in order to stabilize the non-connected tooth steel sheets 31, they need to be fixed to the connected tooth steel sheet 30. By stacking the connected tooth steel sheets 30 and the non-connected tooth steel sheets 31 alternately, the non-connected tooth steel sheets 31 are always fixed to each connected tooth steel sheet 30 via the swage portions 44, and therefore the positions of the non-connected tooth steel sheets 31 are stabilized. Thus, it is necessary that the connected tooth steel sheet 30 is present on at least a surface on one side in the axial direction, of each non-connected tooth steel sheet 31. The connected tooth steel sheets 30 and the non-connected tooth steel sheets 31 are stamped in the same die by progressive pressing, and they are stacked at the same time as being stamped at the last step, and fixed via the swage portions 44. Thus, their positions are aligned with the stamping accuracy of the die.

Next, the manufacturing method for the connection portions 45 will be described with reference to FIG. 8 to FIG. 11.

Figure 8:
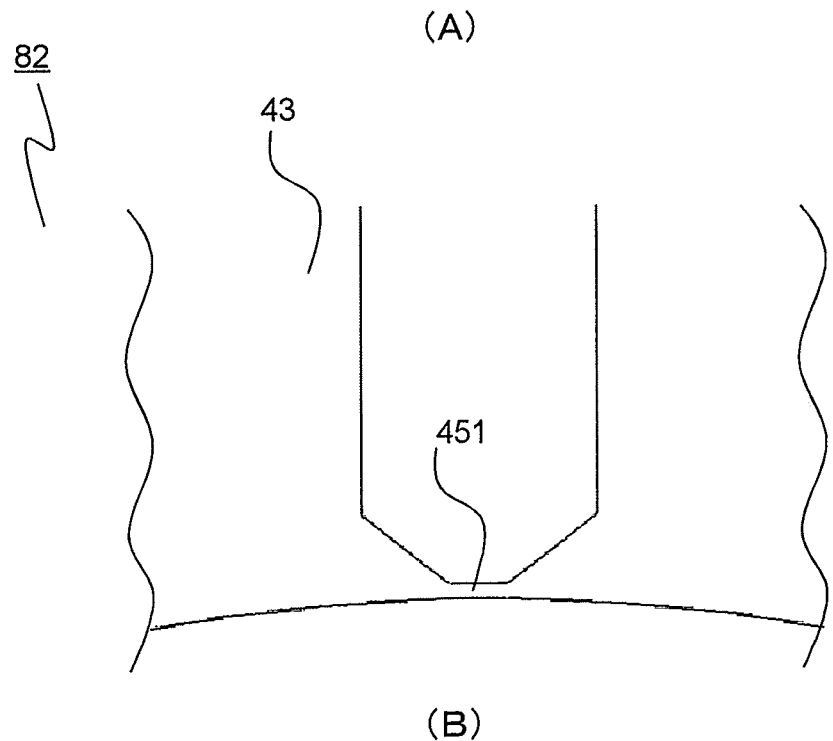
FIG. 8 is a plane view and a front view showing a step for forming connection portions by press process.
Figure 8:
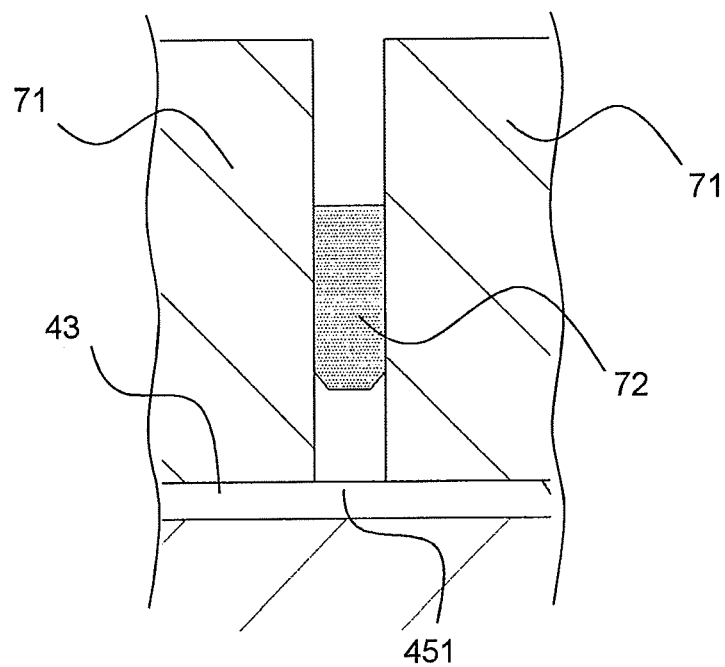
Figure 9:
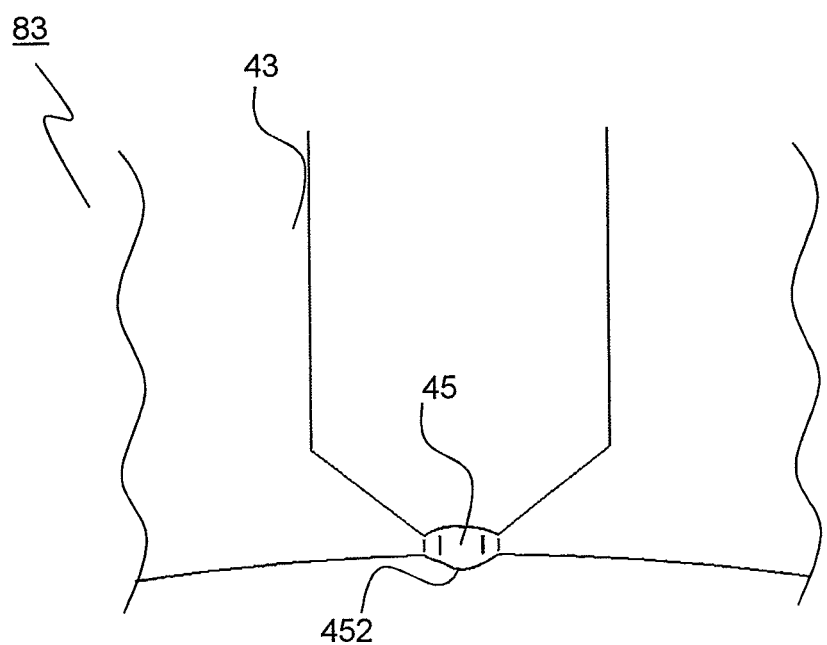
FIG. 9 is a plane view and a front view showing the step for forming the connection portions by press process.
Figure 9:
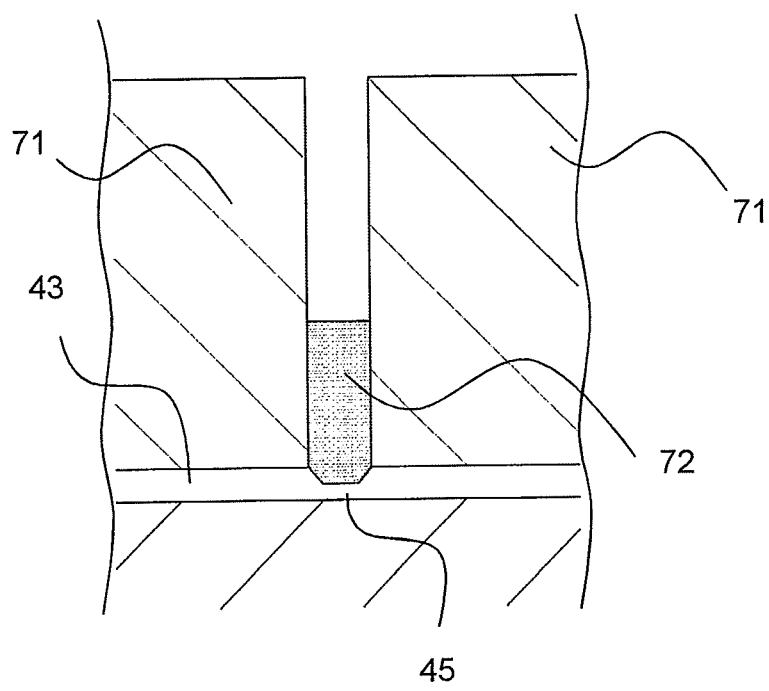
Figure 10:
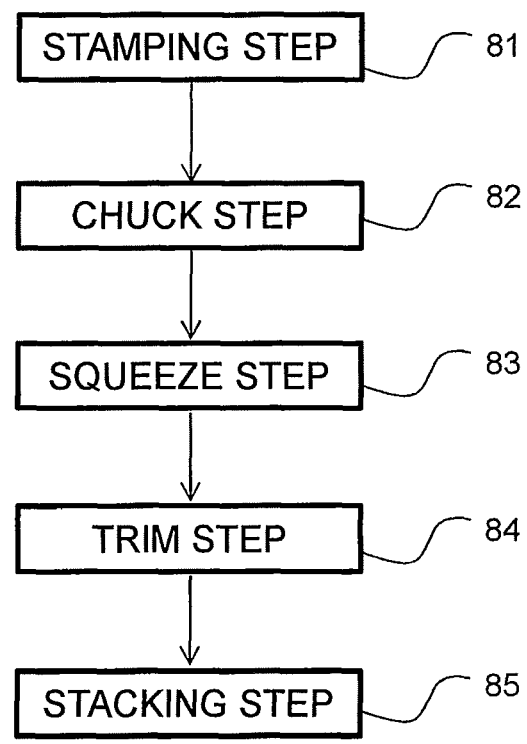
FIG. 10 is a process chart for forming the connection portions.
Figure 11:
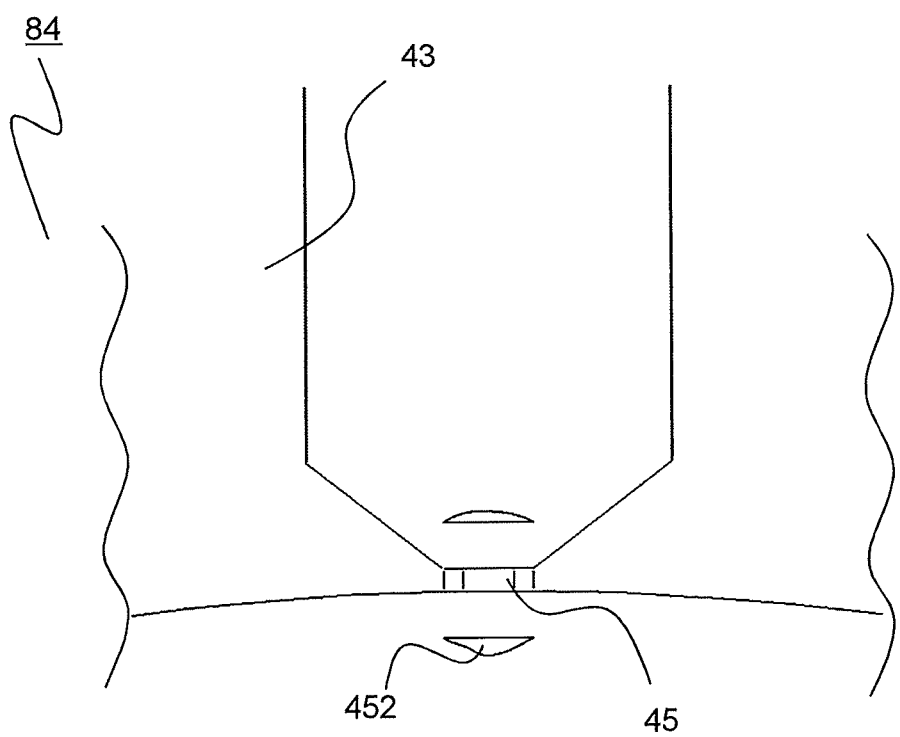
FIG. 11 is a plane view showing the step for forming the connection portions by press process.

FIG. 8 and FIG. 9 are diagrams showing steps for forming the connection portions 45 by press process in stamping dies. FIG. 8(A) and FIG. 9(A) are plane views showing the connection part, and FIG. 8(B) and FIG. 9(B) are front views showing the connection part. FIG. 10 is a process chart for forming the connection portions 45. First, in a chuck step 82 shown in FIG. 8(A), (B), the tooth portions 43 are fixed by fixation dies 71. Next, in a squeeze step 83, an intermediate connection portions 451 which will be the connection portions 45 later are pressed in the axial direction by a squeezing die 72, so as to be thinned (FIG. 9(A), (B)). A part of the intermediate connection portion 451 squeezed at this time protrudes in the radial direction as bulging portions 452. The bulging portions 452 are cut as shown in FIG. 11 (trim step 84). The connection portions 45 are thus manufactured.

Figure 12:
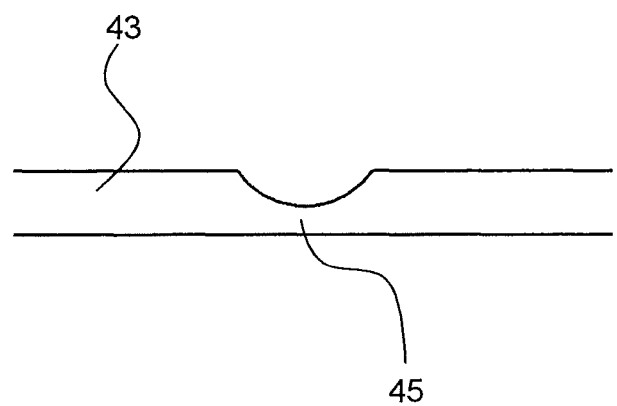
FIG. 12 is a front view showing the connection portion.
Figure 12:
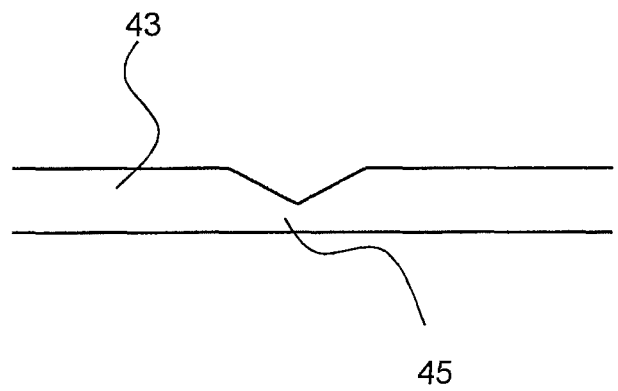

By performing the chuck step 82 before the squeeze step 83 as described above, extension in the circumferential direction that occurs when the squeeze step 83 is performed is suppressed, whereby the pitch between the teeth can be kept accurate. In addition, by removing, in the trim step 84, the bulging portions 452 which are unnecessary parts that have spread in the squeeze step 83, the connected tooth steel sheet 30 can be manufactured accurately and stably. As shown in FIG. 12, the shape of the connection portion 45 may be changed by changing the shape of the squeezing die 72. That is, in FIG. 12(A), the connection portion 45 is squeezed in an arc shape. Using such a shape reduces load on the die, thereby the life of the squeezing die 72 can be increased. FIG. 12(B) shows an example in which the connection portion 45 has a V shape. Using such a shape reduces a working force in pressing, thereby load of the press can be reduced. In the above description, the case of dividing the stator into an inner core side and an outer core side has been described. However, the present embodiment can be similarly applied also to a stator that is integrally formed without being divided.

Embodiment 2

Figure 13:
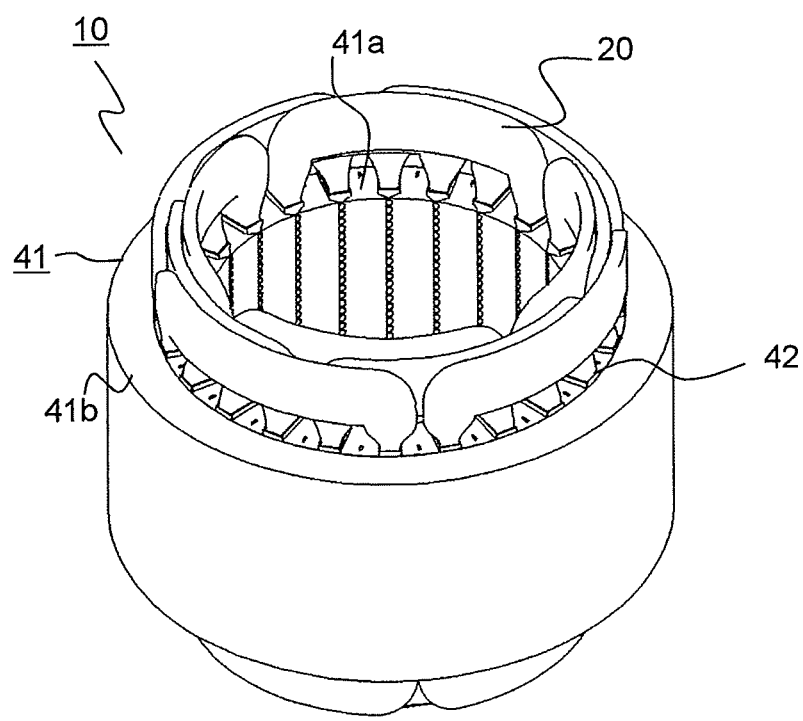
FIG. 13 is a perspective view showing an armature constituting a stator of a rotary electric machine according to embodiment 2.
Figure 14:
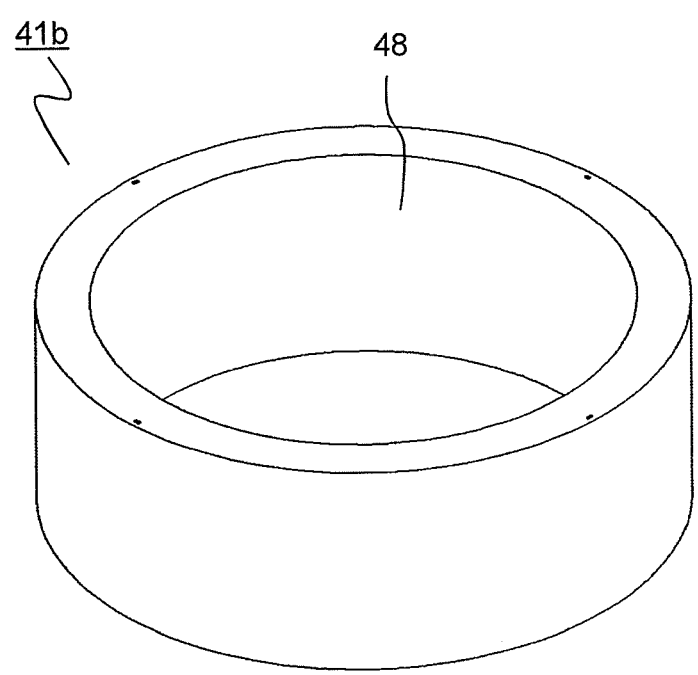
FIG. 14 is a perspective view showing an outer core according to embodiment 2.
Figure 15:
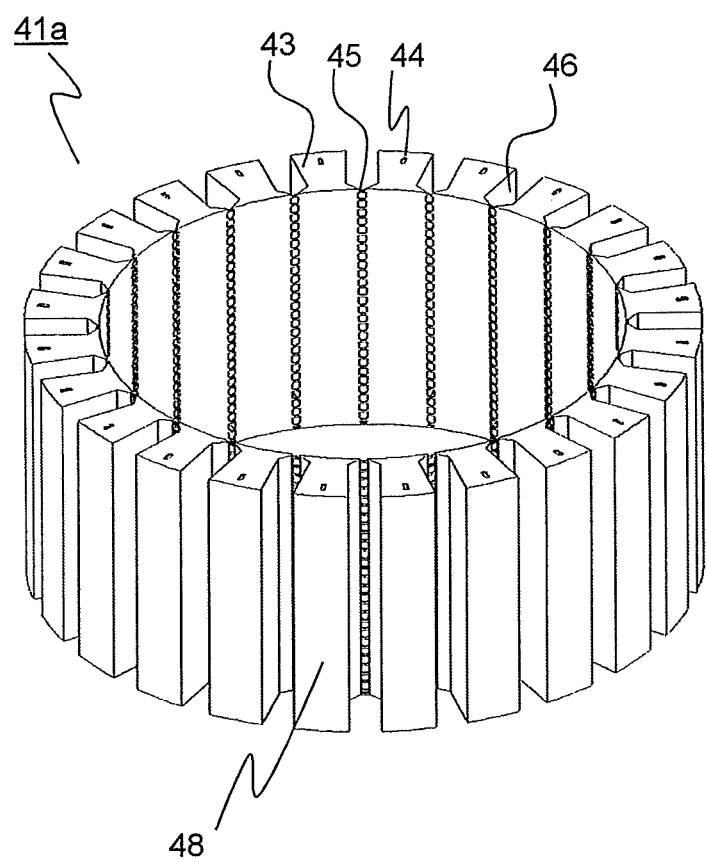
FIG. 15 is a perspective view showing an inner core according to embodiment 2.
Figure 17:
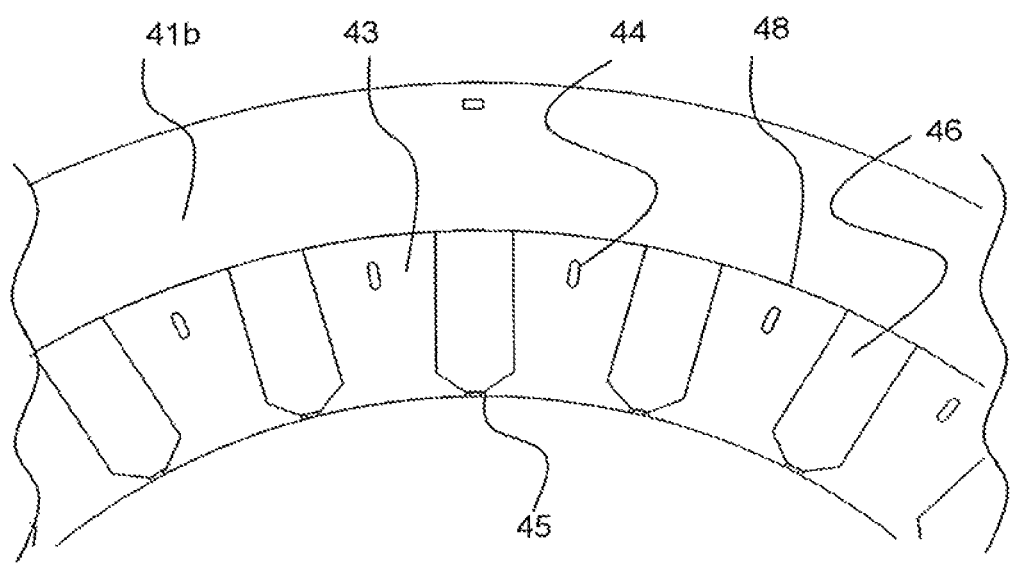
FIG. 17 is a plane view showing the coupling state of the inner core and the outer core.
Figure 17:
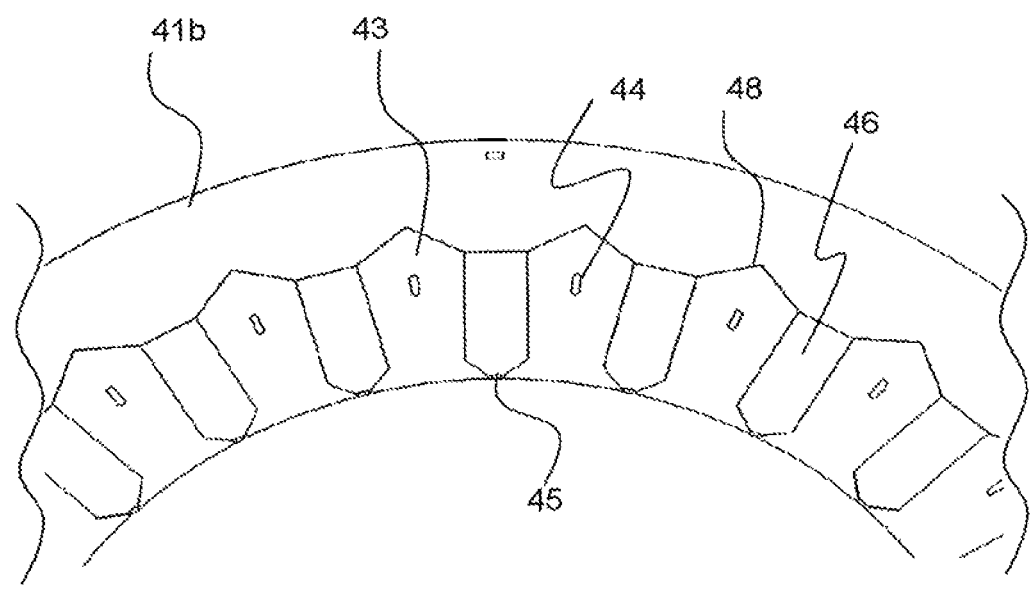

FIG. 13 is a perspective view showing an armature constituting a stator of a rotary electric machine according to embodiment 2. As shown in FIG. 13, the armature 10 includes a core 41, coils 20 mounted to the core 41, and slot cells 42 for electrically insulating the coils 20 and the core 41 from each other. As shown in FIG. 14 and FIG. 15, the core 41 includes an inner core 41a and an outer core 41b. The inner core 41a and the outer core 41b are configured such that the radially outer end of each tooth portion 43 formed in the inner core 41a is press-fitted to each divided surface 48 formed in the outer core 41b. FIG. 14 shows the case (corresponding to FIG. 17) in which a dovetail groove structure as shown in FIG. 3 is not provided. However, such a dovetail groove structure may be provided.

Figure 16:
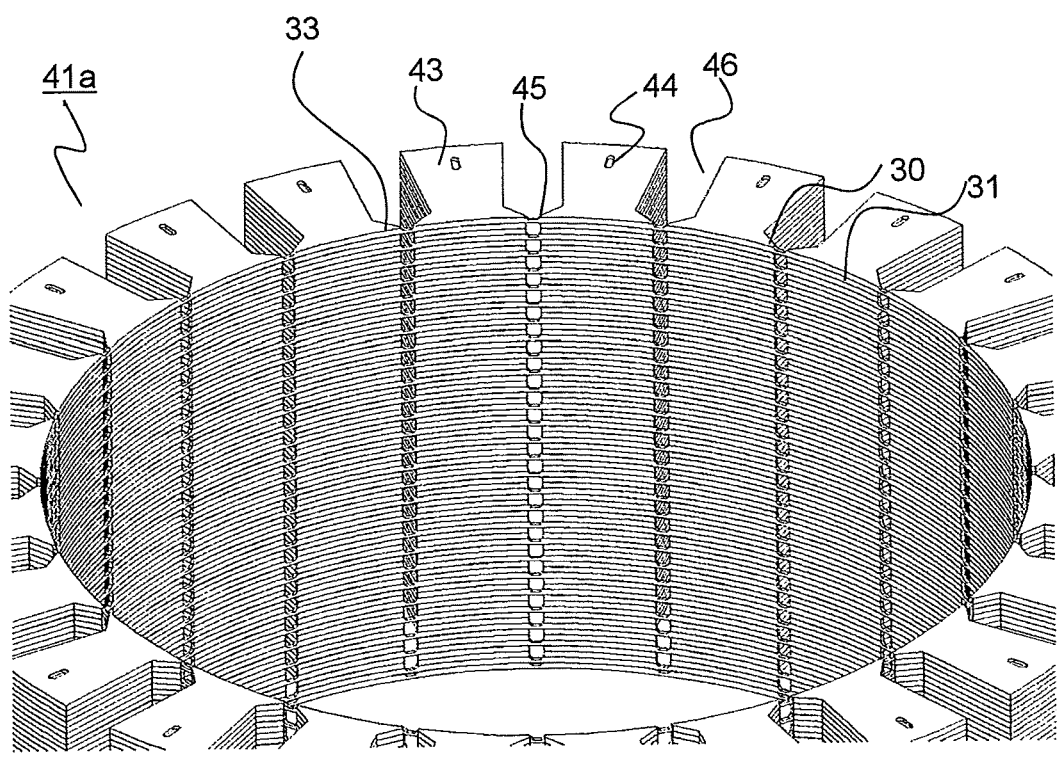
FIG. 16 is a partially enlarged perspective view showing the inner core according to embodiment 2.

As shown in FIG. 15 and FIG. 16, the inner core 41a is formed by magnetic steel sheets stacked in the axial direction, and has divided surfaces 48 to be brought into contact with the outer core 41b later. The steel sheets include: connected tooth steel sheets 30 in which the inner-circumferential-side end portions of the tooth portions 43 are connected by connection portions 45 in an annular shape along the circumferential direction; and non-connected tooth steel sheets 31 which have no connection portion, and which have flanges 33 protruding in the circumferential direction at tooth ends thereof. The connected tooth steel sheets 30 and the non-connected tooth steel sheets 31 are arranged such that two layers of non-connected tooth steel sheets 31 are located between the connected tooth steel sheets 30, and they are alternately joined to each other in the axial direction via swage portions 44 formed in the tooth portions 43. Sectioned slots 46 are formed between the adjacent tooth portions 43.

As described above, the connected tooth steel sheets 30 and the non-connected tooth steel sheets 31 are stacked such that two layers of non-connected tooth steel sheets 31 are located between the connected tooth steel sheets 30. Therefore, one of the end surfaces of each non-connected tooth steel sheet 31 is always joined to the connected tooth steel sheet 30 via the swage portions 44, whereby the positions of the non-connected tooth steel sheets 31 are stabilized. In addition, since gaps between the non-connected tooth steel sheets 31 are increased, the magnetic resistance is further increased. Thus leakage magnetic flux occurring at the tooth ends can be further suppressed.

FIG. 17(A) is a plane view showing the coupling state of the inner core and the outer core. As shown in FIG. 17(A), the divided surfaces 48 do not necessarily need to have dovetail groove structure. The configuration shown in FIG. 17(A) allows decrease in contact surface area during press-fit in comparison with the dovetail groove structure or the like, and thus a press-fit force can be reduced. As shown in FIG. 17(B), the divided surfaces 48 may be formed into the V groove shape, to stabilize the positions of the tooth portions 43 in the circumferential direction.

It is noted that, within the scope of the present invention, the above embodiments may be freely combined with each other, or each of the above embodiments may be modified or eliminated appropriately.

The invention claimed is:

1. A rotary electric machine comprising:
a rotor having a rotor core fixed to a rotary shaft; and
a stator arranged with a gap from the rotor core, wherein
a stator core has an inner core in which a plurality of tooth portions serving as magnetic poles are radially arranged at equal intervals, and an outer core which forms a yoke for connecting the plurality of tooth portions magnetically,
the inner core is formed by a plurality of magnetic steel sheets having the plurality of tooth portions and stacked in an axial direction,
the plurality of steel sheets include: connected tooth steel sheets in which all inner-circumferential-side end portions of the plurality of tooth portions are connected via connection portions in an annular shape along a circumferential direction; and non-connected tooth steel sheets which are separated from each other with all of the plurality of tooth portions not connected to each other,
the connected tooth steel sheets and the non-connected tooth steel sheets are joined to each other in the axial direction via swage portions provided in the plurality of tooth portions,
a thickness of each connection portion is smaller than a thickness of the other part of each steel sheet, and
the connected tooth steel sheets are provided in both end parts of the inner core in the axial direction.

2. The rotary electric machine according to claim 1, wherein each connected tooth steel sheet is present on at least a surface on one side in the axial direction, of each non-connected tooth steel sheet.

3. The rotary electric machine according to claim 2, wherein the connected tooth steel sheets and the non-connected tooth steel sheets are stacked one by one alternately.

4. The rotary electric machine according to claim 2, wherein two layers of the non-connected tooth steel sheets are located between the connected tooth steel sheets.

5. A method for manufacturing the connected tooth steel sheets in the rotary electric machine according to claim 1, the method comprising:
a chuck step of fixing each tooth portion of each connected tooth steel sheet;
a squeeze step of processing intermediate connection portions of the connected tooth steel sheets by a squeezing die so as to be thinned, thereby forming the connection portions; and
a trim step of trimming unnecessary part that has spread in the squeeze step.

* * * * *